Dec. 31, 1946.  S. J. SMITH  2,413,389

ADDITIVE MULTIRANGE ELECTRONIC MEASURING INSTRUMENT

Filed July 21, 1943

INVENTOR
Stanley J. Smith
By Watson, Cole, Grindle & Watson
ATTYS

Patented Dec. 31, 1946

2,413,389

UNITED STATES PATENT OFFICE 2,413,389

ADDITIVE MULTIRANGE ELECTRONIC MEASURING INSTRUMENT

Stanley James Smith, London, England, assignor to Simmonds Aerocessories Limited, London, England Application July 21, 1943, Serial No. 495,656
In Great Britain July 21, 1942

1 Claim. (Cl. 171—95)

This invention relates to electronic measuring instruments. More particularly the invention relates to electronic voltmeters and to Q meters or other measuring instruments embodying such voltmeters.

It is an object of the present invention to provide an improved measuring instrument of the type known as a Q meter.

A further object of the invention is to provide a multi-range electronic voltmeter for use in a Q meter or other measuring apparatus wherein the several scale ranges are additive.

A still further object of the invention is to provide a Q meter wherein the input of the measuring circuit is monitored by means of an electronic voltmeter instead of by a thermo-couple current measuring instrument as has been the general practice heretofore.

Figure 1:
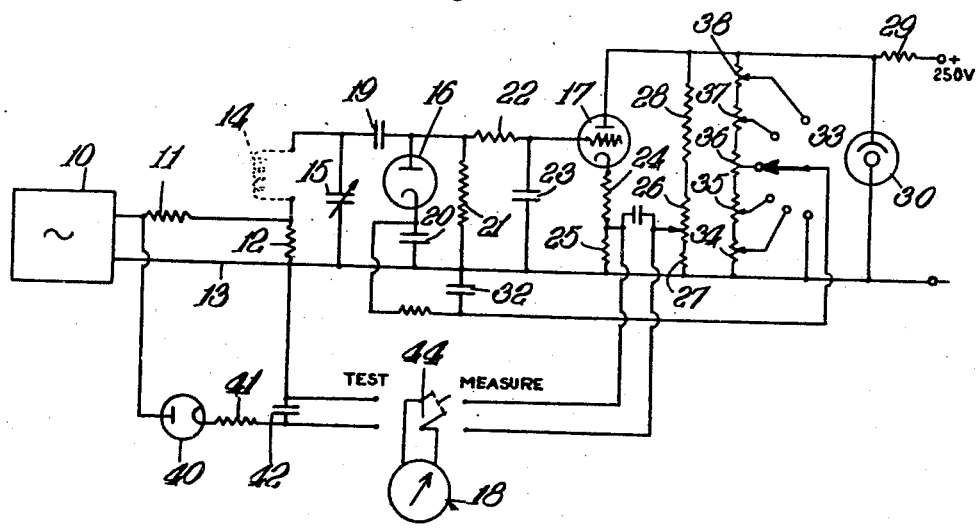
Figure 2:
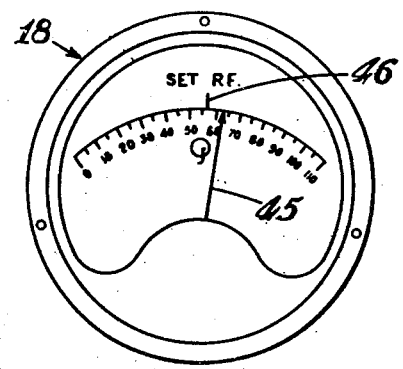

Other objects and advantages of the present invention will be apparent from the following description in connection with the accompanying drawing in which Fig. 1 shows, partly in diagrammatic form, the circuit arrangement of a Q meter embodying the invention; and Fig. 2 is a view of the dial of the indicating device used in the Q meter of Fig. 1 showing the calibration of the scale.

Electronic voltmeters are usually provided with a plurality of ranges which normally are made multiples of one another. Usually this is the most convenient arrangement since the reading accuracy is then a constant percentage of the full scale indication. Where however it is desired to measure small changes about a mean value such an arrangement becomes impractical since as the mean value increases in magnitude the instrument becomes increasingly insensitive to the small changes. For example, in a known form of Q meter having scales reading 0–250 Q and 0–500 Q, a small change of, say, 20 Q from a relatively large value of, say 400 Q, will cause a pointer movement which is only 4% of the scale and which may be unreadable or readable only with difficulty. On the other hand when a Q meter is used in the known manner for testing, for example, the loss factor of dielectrics by introducing a sample of the material into the test circuit and noting the reduction in Q, such small changes in Q may easily occur particularly if the sample is of low loss and it is accordingly important to be able to read such small changes with certainty. With the Q meter of the present invention wherein the scale ranges are additive in steps of 100 Q, a change in a Q of 20 from a Q value of 400 will produce a pointer movement of 20% of the scale.

Referring to Fig. 1 the improved Q meter comprises a source of radio frequency current 10 the frequency of which is variable over a wide range. Such a device is well known in the art and since it forms no part of the present invention will not be further described. Current from the source 10 flows through resistor 11 and resistor 12 to the ground line 13. Resistor 12 is also included in a series circuit of inductance coil 14 and variable condenser 15. This circuit constitutes the measuring circuit and normally coil 14 will be a coil under test whose Q it is desired to determine. The potential difference set up across resistor 12 due to the flow of current from the source 10 is thus injected into the tuned circuit 14, 15 and when the circuit is tuned to resonance with the source will cause a large current to flow therein. If the voltage set up across the condenser 15 is measured the ratio condenser voltage/injected voltage will represent the Q factor of the circuit. Since condenser 15 is of low loss construction and the value of resistor 12 very low, of the order of 0.05 ohm, the Q factor will in effect be that of the coil 14 alone. In practice the P. D. across resistor 12 is maintained constant e. g. by adjusting the voltage of the high tension supply to the generator 10 so that the voltage set up across condenser 15 is a direct measure of the Q of the coil under test.

The resonant voltage set up across the condenser 15 is measured by means of an electronic voltmeter comprising a diode rectifier 16, D. C. amplifier 17 and indicating instrument 18.

The anode of diode 16 is connected with the high potential terminal of condenser 15 through a condenser 19 and the cathode is grounded for alternating current through condenser 20. The anode of diode 16 is also connected with ground through a load resistor 21 and with the grid of the D. C. amplifier 17 through a low pass filter comprising resistor 22 and condenser 23. The D. C. amplifier 17 is arranged in the known manner as a balanced bridge circuit with the indicating instrument 18 connected between the junction of resistors 24 and 25, which are connected between the cathode of tube 17 and ground, and a variable tapping point on a potential divider 26 connected in series with resistors 27 and 28 connected between the positive high tension line and ground. Potential divider 26 operates in the known manner as a zero setting device for the indicating instrument 18. The high tension supply which may be obtained from a rectifier in the known manner is shown stabilized by means of resistor 29 and neon tube 30.

The additive multi-range scales of the voltmeter are obtained as follows.

The cathode of diode 16 is connected through a filter comprising resistor 31 and condenser 32 with the movable arm of a multi-point switch 33. The fixed contacts of switch 33 are connected respectively with ground and tapping points on potential dividers 34—38 which are connected between the positive high tension line and ground. Thus by operation of the switch 33 increasing positive potential may be applied to the cathode of diode 16 relative to the anode thereof. With the switch 33 in its lowest position, range 1. the diode cathode is connected to ground. In this condition full scale on the indicating instrument may be obtained for an applied voltage of say 1.1 volts. With the input adjusted to a value giving a reading of 1.0 volt switch 33 is moved to range 2. and the slider of potential divider 34 adjusted such that with the same input the instrument reads zero. The input is now increased to give a reading again of 1.0 volt, switch 33 is set to range 3. and the slider of potential divider 35 adjusted to make the reading once again zero. Ranges 4., 5. and 6. are adjusted in a similar manner. It will be seen therefore that each step of the switch 33 adds one volt to the total range of the meter. For the sake of simplicity the operation has been described in terms of voltage. In practice the instrument 18 will be calibrated in terms of Q, the initial range being conveniently 110 Q and each step of the switch 33 adding 100 Q. Fig. 2 shows a representation of the dial of the indicating instrument 18 of Fig. 1. With the pointer 45 in the position illustrated and the switch 33 in the position shown in Fig. 1 the Q valve of the coil under test is seen to be 63+300. The knob of switch 33 is conveniently calibrated to read Add 0 Q, 100 Q, ... etc. according to position, the amount indicated being added to the meter reading.

The Q meter of the present invention also comprises an improved arrangement for monitoring the current flowing through the injector resistance in the measuring circuit. Referring to Fig. 1 current flows from the source 10 through resistor 11 and the injector resistor 12. The magnitude of this current is measured by measuring the voltage developed across resistor 11, the value of which is at least 100 times the value of resistor 12. This measurement is effected by of a second electronic voltmeter comprising a rectifying diode 40 the anode of which is connected with the high potential end of resistor 11 and the cathode of which is connected through a low-pass filter comprising resistor 41 and condenser 42 and the windings of instrument 18 to ground. The constants of the circuit of diode 40 and the value of resistor 11 are such that when the desired P. D. is set up across the resistor 12 the pointer of the instrument 18 will reach a definite mark on the scale. As shown in Fig. 2 this mark 46 may conveniently be arranged on the scale where the pointer is vertical and is denoted by the legend "Set RF" in this figure. Meter 18 is connected either with diode 40 or with the D. C. amplifier 17 by means of a double pole double throw switch indicated diagrammatically at 44, the switch positions being marked "Test" and "Measure" respectively.

In operating the improved Q meter of the present invention after the inductance coil 14 under test has been connected and the frequency of the source 10 adjusted approximately to the resonant frequency of the measuring circuit 14, 15, the switch 44 is thrown to the "Test" position and the output of the source adjusted e. g. by adjusting the voltage of the high tension supply to the generator 10 until the meter pointer reaches the mark 46 "Set RF." The desired P. D. is now established across resistor 12 and with the switch 33 at position 44 set to "Measure" and the switch 33 at position 1. the frequency of the source or condenser 17 is adjusted to bring circuit 14—15 into resonance with the source this point being indicated by a maximum deflection of meter 18. If this deflection is off scale switch 33 is rotated until the pointer gives an on scale reading after final adjustment of the tuning has been made. After checking, by operation of switch 44, that the current from the source is still of the desired value the Q factor of the coil under test is read by noting the maximum meter reading and adding to that reading the number of hundreds of Q indicated by switch 33.

It will be appreciated that apart from its use in testing the Q factor of inductance coils the improved Q meter greatly facilitates measurements on dielectrics involving small changes in Q about a mean value. If desired the scale can be still further opened up by adding further positions to the switch 33 thus dividing the range into still smaller steps.

The improved Q meter possesses a further advantage over prior art instruments in that a robust electronic voltmeter is used instead of the usual thermo-couple meter for monitoring the input. There is consequently nothing to burn out and the calibration can be maintained indefinitely.

It will be understood by those skilled in the art that resistors 11 and 12 must present a very low reactance at any frequency at which the instrument is to be used and while the magnitude of resistor 11 is such as to permit the use of orthodox design it is preferred to use as resistor 12 the special low reactance resistor which forms the subject of my co-pending application Serial No. 495,655, filed July 21, 1943.

I claim:

A multi-range electronic volt meter having additive scale ranges comprising a rectifier tube having an input circuit to which the voltage to be measured is applied and output circuit, an amplifying tube connecting with the said output circuit, an indicating instrument connected with the output of said amplifier tube, a power supply constituting a source of anode current for said amplifying tube, resistors in series across said power supply for producing a series of predetermined bias potentials, each corresponding to a different indicating range for said instrument, a range changing switch for connecting a selected bias potential with the input circuit of the said rectifier tube, the difference in magnitude of adjacent bias potentials in the series being such that an applied voltage that produces the maximum indication in any one range produces a zero reading in the next higher range.

STANLEY JAMES SMITH.